(12) United States Patent
Tweedie (10) Patent No.: US 8,464,478 B2
(45) Date of Patent: *Jun. 18, 2013

(54) NEXT GENERATION PHOTOVOLTAIC SOLAR PANEL PIGGYBACK MOUNTING SYSTEM

(71) Applicant: Richard Tweedie, Santa Rosa, CA (US)

(72) Inventor: Richard Tweedie, Santa Rosa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/646,636

(22) Filed: Oct. 5, 2012

(65) Prior Publication Data

US 2013/0086852 A1  Apr. 11, 2013

Related U.S. Application Data

(60) Provisional application No. 61/544,746, filed on Oct. 7, 2011.

(51) Int. Cl.
*E04D 13/18* (2006.01)
(52) U.S. Cl.
USPC ........................................ 52/173.3; 52/506.05

(58) Field of Classification Search
USPC ............ 52/173.3, 506.05, 511, 552; 248/200, 248/237
See application file for complete search history.

(56) References Cited

U.S. PATENT DOCUMENTS

| | | | |
|---|---|---|---|
| 6,453,633 B1 * | 9/2002 | Wilkinson et al. | 52/506.06 |
| 6,640,503 B1 * | 11/2003 | Evensen et al. | 52/60 |
| 7,155,870 B2 * | 1/2007 | Almy | 52/544 |
| 7,814,899 B1 * | 10/2010 | Port | 126/623 |
| 7,971,398 B2 * | 7/2011 | Tweedie | 52/173.3 |
| 2006/0156648 A1 * | 7/2006 | Thompson et al. | 52/173.3 |

* cited by examiner

*Primary Examiner* — Basil Katcheves
(74) *Attorney, Agent, or Firm* — Bay Area Technology Law Group PC (57) ABSTRACT

A system and method for mounting photovoltaic solar panels onto a roof. The system includes first and second strut rails spaced from the roof employing a series of standoffs, the strut rails having a length, cross section, a base and side walls, side walls terminating with first and second turned in edges. First and second mounting fixtures are attached to the photovoltaic solar panels which are of a type and geometry enabling the solar panels to be removably appended to the strut rails. The first and second mounting fixtures can be applied to the photovoltaic solar panels before being elevated to a roof.

11 Claims, 8 Drawing Sheets

NEXT GENERATION PHOTOVOLTAIC SOLAR PANEL PIGGYBACK MOUNTING SYSTEM

RELATED APPLICATION DATA

The present application claims priority of U.S. Provisional Patent Application Ser. No. 61/544,746, filed on Oct. 7, 2011.

TECHNICAL FIELD

The present invention is directed to a system for mounting photovoltaic solar panels onto a roof in a safer, more expedient and efficient manner than has previously been possible. The present system includes self-grounding hardware much of which can be installed on the photovoltaic solar panels prior to elevating them to a roof top location thus dramatically increasing the safety factor of such an installation.

BACKGROUND OF THE INVENTION

Virtually all roof top solar installations involve the elevation and securement of photovoltaic solar panels that are fixed in place by standoffs that penetrate the roof to tie the installation into structural rafters. Horizontally aligned rails hold the panels off of a roof to allow cooling ventilation to their undersides while providing points of attachment for the panels.

Currently, photovoltaic solar panels and mounting hardware are elevated to the roof prior to installation. The photovoltaic solar panels are roughly positioned over rails and wires attached and clamps installed. Again, all of this is done generally on an elevated and oftentimes slanted roof. Clamps of various sizes dedicated to different module thicknesses and corresponding nuts and bolts are typically slid down the channel of previously installed rails. The modules are visually positioned for plumb and tightened while holding them in place. This requires several operators. It is noted that if a first module is out of plumb, the entire panel row will be askew. If a wire is loose and requires checking, all clamps needed to hold a photovoltaic solar panel in place must be removed to lift the module from its supporting rails. If a failed module is in the middle of a large array, there is no convenient way to remove it.

In creating the necessary electrical connections to the panels, the prior art suggests a lay-in lug with a slotted side entry attached to each module frame with a stainless steel star washer, screw and nut to penetrate generally employed anodized coatings. This is clearly necessary to create an acceptable ground connection. A heavy gage continuous solid copper grounding wire is attached to each ground lug providing both electrical ground and protection against a potential lightening strike. Panel grounding represents a significant portion of the time required to install a solar array. Also, mechanical tying of panels makes any subsequent adjustment or replacement quite difficult.

It is thus an object of the present invention to provide a system approach to the installation of photovoltaic solar panels improving upon current installation techniques and hardware.

It is yet a further object of the present invention to provide an improved system for mounting photovoltaic solar panels by combining offsite preassembly with specially designed hardware enabling a good deal of the assembly to be conducted at ground level and before panels are lifted to their eventual roof top installation.

It is yet a further object of the present invention to provide a system and method for mounting photovoltaic solar panels which can be carried out by a single installer and helper in a manner which is significantly safer than installations currently being conducted.

It is yet a further object of the present invention to provide a system and method of installing photovoltaic solar panels which enable the panels to be placed on floating standoffs isolated from thermal expansion while eliminating continuous ground wires between panels.

It is still another object of the present invention to provide pivot mounts for photovoltaic solar panels which provide for their immediate drop-in location and conveniently hinged application and removal in the need for panel inspection removal or adjustment.

It is yet a further object of the present invention to provide a system and method for mounting photovoltaic solar panels designed to be installed by a single installer together with one assistant in a manner which is significantly safer than installations currently being conducted.

These and further objects will be more readily apparent when considering the following disclosure and appended claims.

SUMMARY OF THE INVENTION

A system and method for mounting photovoltaic solar panels onto a roof, said system comprising first and second strut rails, each strut rail having a length and a cross section, each cross section having a base, side walls and first and second turned in edges, a first mounting fixture comprising a mounting block for removably appending said photovoltaic solar panels to a first of said strut rails, said first mounting block having a tooth at its first edge and a cam at its second edge, said tooth sized and positioned to fit beneath a first turned in edge of said first strut rail while said cam frictionally abuts a second turned in edge of said first strut rail and a second mounting fixture for removably appending said photovoltaic solar panel to said second strut rail, said second mounting fixture comprising a penetrating shaft preferably as a substantially rectangular shaped member being sized to extend between said side walls of said second strut rail and further having an indent or notch configured therein for capturing one of said first or second turned in edges upon urging said shaft against it for releasably securing said photovoltaic solar panels to said second strut rail. The system also includes improved features such as a hook and groove interface to connect adjacent panels thus eliminating the need for multiple strut rails beyond the installation of a first solar panel, an improved ground strip for improving electrical grounding whenever the first mounting block is in contact with its corresponding strut rail and a grounding clip enabling a ground wire to selectively remain in electrical contact with the system.

DETAILED DESCRIPTION OF THE INVENTION

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

The present invention is related to applicant's prior U.S. Pat. Nos. 7,971,398 and 8,136,310, the disclosure of each being incorporated by reference herein. The present application deals with improvements to systems disclosed in the referenced patents of applicant, the details of which will become quite apparent in what follows.

Figure 1A:
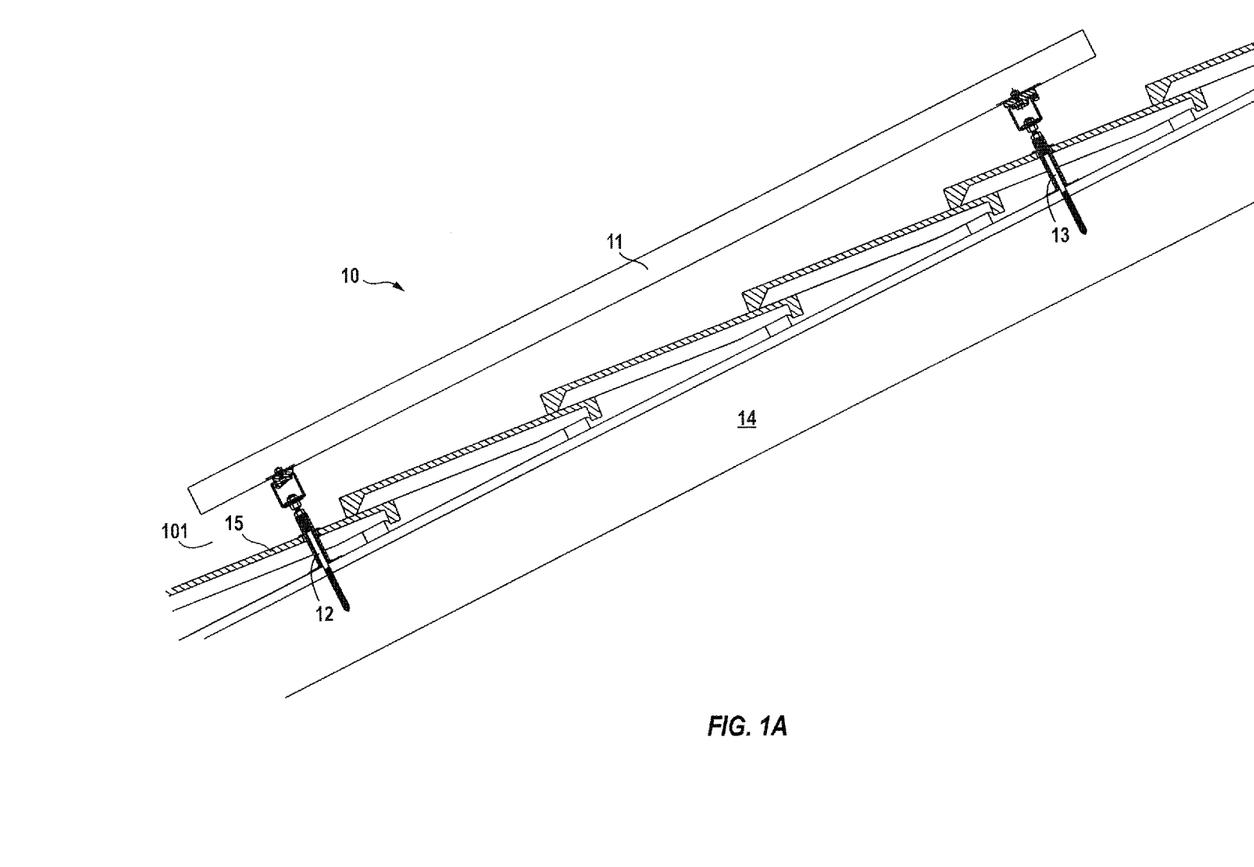
FIGS. 1A and 1B are a side cross sectional views of an installation employing the present invention.
Figure 1B:
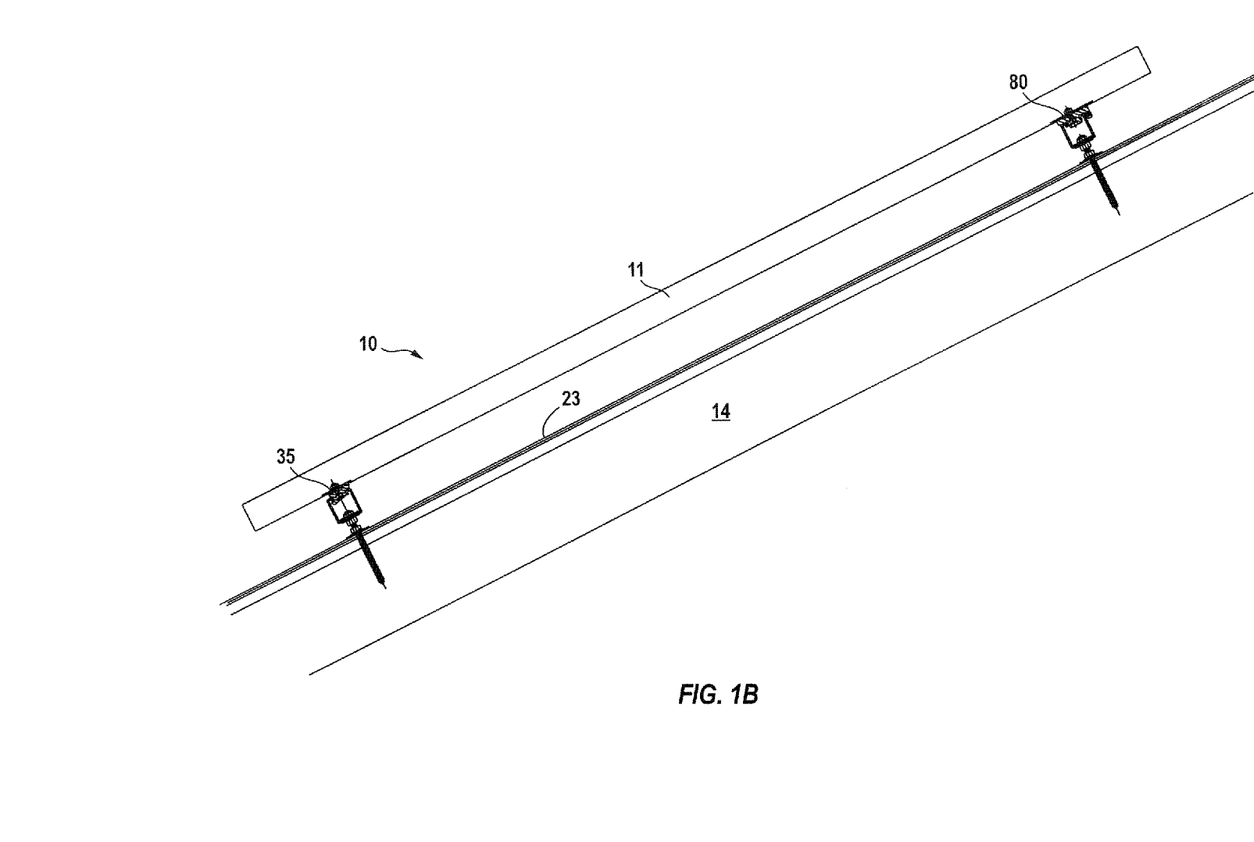

Turning first to FIGS. 1A and 1B, the present invention involves system 10 for mounting photovoltaic solar panel 11 onto a roof. FIG. 1A shows system 10 mounted onto roof tiles 15, and FIG. 1B shows system 10 mounted onto a composite roof surface 23. Mounting is generally carried out by providing standoffs best visualized by reference to FIGS. 2A and 2B.

Figure 2A:
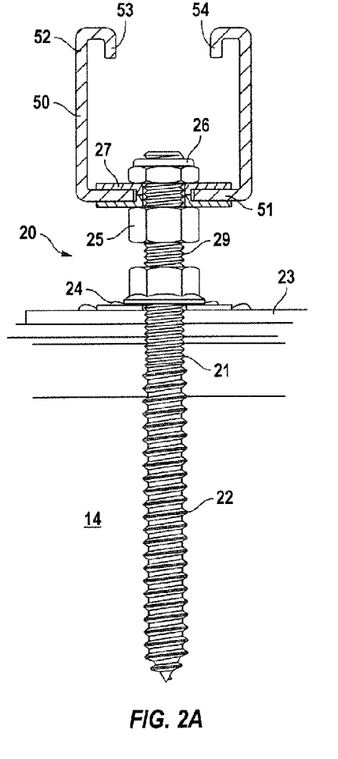
FIGS. 2A and 2B are detailed side partial cross sectional views of standoffs employed in securing the present invention to a typical roof top installation.

FIG. 2A shows composition standoff 20 is in the form of threaded hanger screw 21 having a series of threads 22 which, upon installation, are embedded within rafter 14. FIG. 2A is specifically illustrative of a standoff used on a composite roof whereby composite roof surface 23 is penetrated by hanger screw 21 and sealant 24, such as Geocel 2300 Tripolymer, employed to prevent water intrusion below composite roof surface 23.

As noted, hanger screw 21 has threaded shaft 29 of sufficient length as to space strut rail 50 from composite roof surface 23. As strut rail 50 will act to support the appropriate photovoltaic solar panel 11, the standoff height of fixed nut 25 of hanger screw 21 is such that photovoltaic solar panel 11 will be provided with appropriate ventilation. This is best seen in FIG. 1A noting standoffs 12 and 13 support photovoltaic solar panel 11 spaced from roof tiles 15.

Figure 2B:
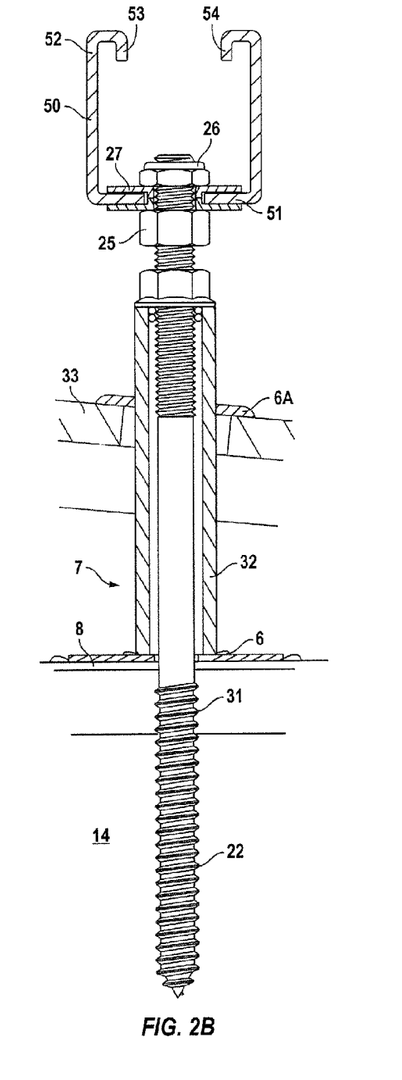

FIG. 2B illustrates tile standoff 7 having hanger screw 31 with series of threads 22 also penetrating rafter 14. In this illustration, a tile roof is the medium upon which photovoltaic solar panel 11 is to be applied whereby tar paper 8 acts as a water barrier including sealant 6 employed about aluminum tubing 32 which, in turn, surrounds hanger screw 31. Tile 33 is further penetrated by the hanger screw 31 again employing appropriate sealant 6A to prevent water penetration. The top of hanger screw 31 is terminated by nylon jam nut 26 including shoulder washers 27 for vertical capture of strut rail member 50. The combined height of the two shoulders of washers 27 is slightly greater than the thickness of rail base 51, thus allowing space for thermal expansion and enabling the strut rails to slide or "float" on standoffs.

Figure 8A:
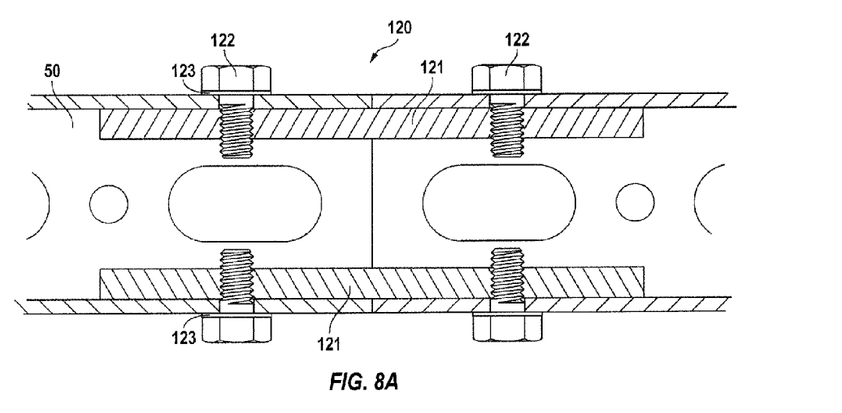
FIGS. 8A and 8B are sectional views of a rail splice depicting attachment of rails 50 as abutted and bolted together. Electrical conductivity is assured by star washers under bolt heads.
Figure 8B:
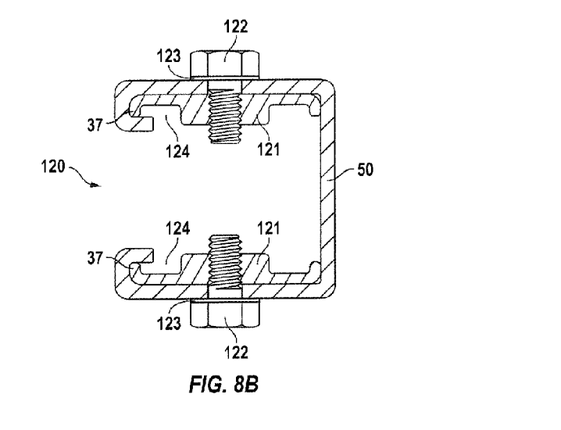

In applying a first photovoltaic solar panel, standoffs 7 and 20 are first applied to the appropriate composition or tile roof as shown in FIGS. 2A and 2B and spaced as parallel members upon the appropriate roof as shown in FIGS. 1A and 1B. Strut rail members 50 are generally provided in 10 or 20 ft. lengths and are applied end to end for the appropriate longitudinal lengths dictated by the number of photovoltaic solar panels. FIGS. 8A and 8B show preferred method of end to end attachment of strut rail members.

Referring again to FIGS. 2A & 2B, it should be noted that standoffs 7 and 20 are placed upon the appropriate roof prior to the installation of the first photovoltaic solar panel with fewer standoffs applied per panel thereafter as discussed in detail below. Thus, a good deal of the hardware associated with the present installation is applied to a roof before the relatively heavy photovoltaic solar panels, themselves, are hoisted to the roof surface.

The strut rails 50 are of a standard variety generally composed of formed steel or extruded aluminum having a series of slotted openings 76/79 (FIG. 6B) evenly spaced along their lengths and further having cross sections, each cross section having base 51, side walls 52 and first and second turned in edges 53 and 54.

Figure 7A:
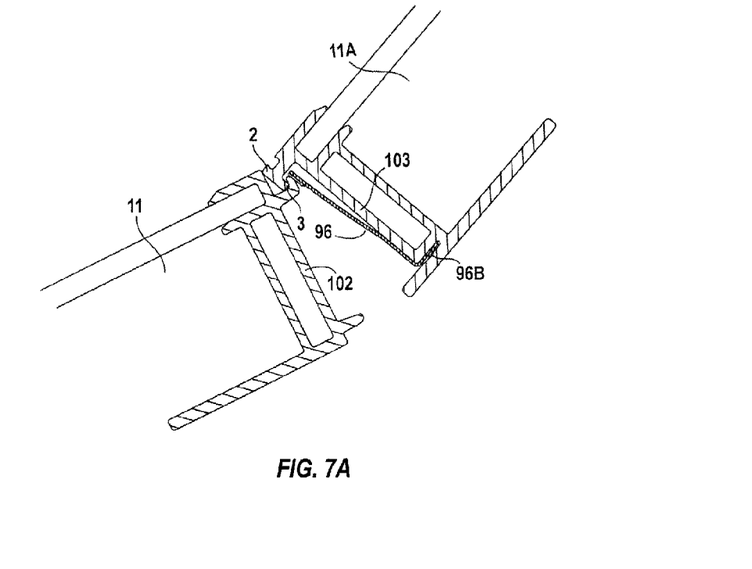
FIGS. 7A and 7B are cross sectional views of the interface between adjacent photovoltaic solar panels illustrating the hook and groove connection between such panels.
Figure 7B:
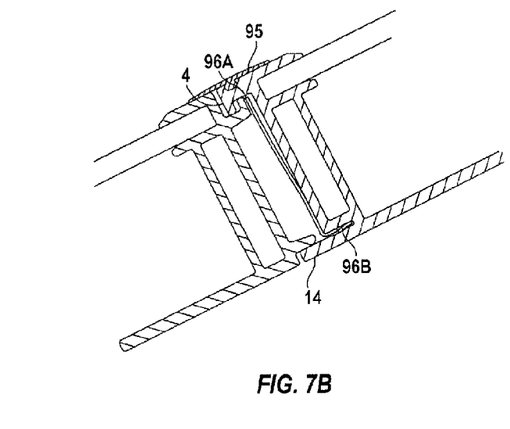

Previously, applicant suggested in his '398 and '310 patents that the generally rectangular photovoltaic solar panels 11 each possess a mounting fixture placed proximate their corners for releasable engagement with strut rails 50. The first of such mounting fixtures is depicted in reference to FIGS. 3A and 3B, discussed below. It has now been determined that the first photovoltaic solar panel 11 to be applied to a roof surface, in fact, support appropriate mounting fixtures that are placed proximate its corners as suggested. However, economies can be realized by practicing the present invention and, in this regard, specific reference is made to FIGS. 3A and 3B in conjunction with details depicted in FIGS. 7A and 7B.

Figure 3A:
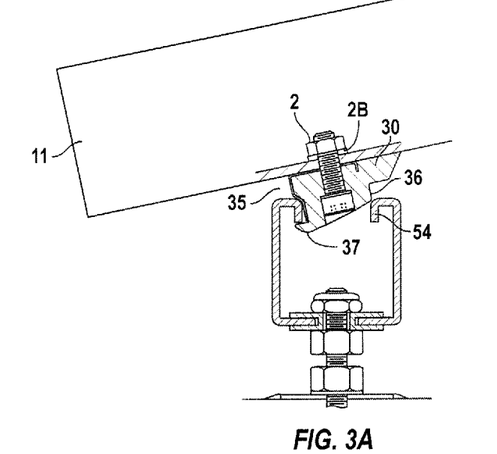
FIGS. 3A and 3B are side cross sectional views of a first mounting fixture employed to secure a photovoltaic solar panel to the strut rails of the present invention.
Figure 3B:
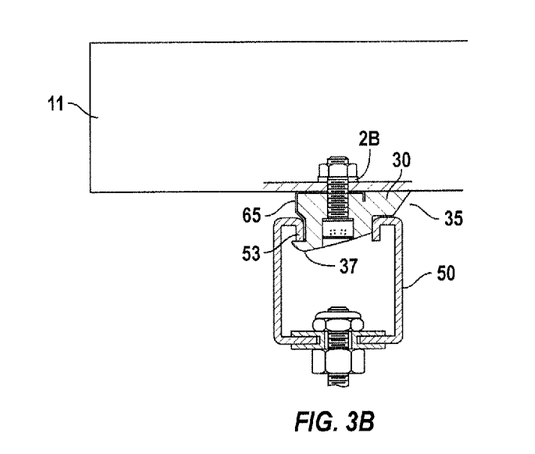

Turning first to FIG. 3A, first mounting fixture 35 is provided generally along a lower edge of first to be applied photovoltaic solar panel 11 positioned to enable an installer to generally engage first mounting fixture 35 upon lower strut rail 50 in commencing the installation. Most roofs are slanted, as noted in FIGS. 1A and 1B. In such an environment first mounting fixture 35 would be installed on the strut rail located on the vertically lower segment of the roof. In this regard, it is noted that both first mounting fixture 35 and second mounting fixture 80 (FIGS. 5A and 5B) are applied to photovoltaic solar panel 11 via bolt 2/2A prior to elevating the solar panels to the roof surface. Thus, most of the mounting hardware is fixed where appropriate at ground level prior to the lifting, balancing and positioning of the photovoltaic solar panels into their final positions.

Turning back once again to FIGS. 3A and 3B, it is noted that first mounting fixture 35 comprises a mounting block 30 for removably appending photovoltaic solar panel 11 to a first of strut rails 50. First mounting block 30 has tooth 37 at its first edge and cam 36 at its second edge, tooth 37 sized and positioned to fit beneath first turned in edge 53 of strut rail 50 while cam 36 frictionally abuts second turned in edge 54 of strut rail 50. The elegance and simplicity of this design should not go unnoticed as an installer merely positions the lower edge of photovoltaic solar panel 11 on the first or lower strut rail 50 by hooking tooth 37 beneath turned in edge 53 whereupon cam 36 is pressed against second turned in edge 54 to create a snug connection. In doing so, ground clip 65 secured to first mounting fixture 35 extends to tooth 37 which provides a grounding path for as long as first mounting block 35 is in contact with first strut rail 50 to ensure "first make, last break" grounding contact between strut rail 50 and mounting block 30. Ground clip 65 is made of conductive material such as stainless steel and is bent as shown to be installation ready to enable it to snap into place on pivot mount 35 as shown. Knife edges 69 and integral star washer 66 are used for penetrating any anodized aluminum plating. The knife edges 69 are cut as parallel straight grooves around pivot edge 63. Rotation under preload provides a self-cleansing interface.

Figure 4A:
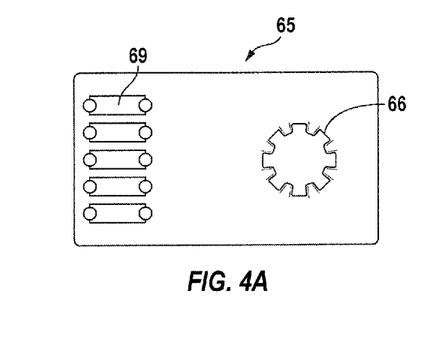
FIGS. 4A and 4B are plan and side views of the improved ground clip used in conjunction with the first mounting block as depicted in FIGS. 3A and 3B.
Figure 4B:
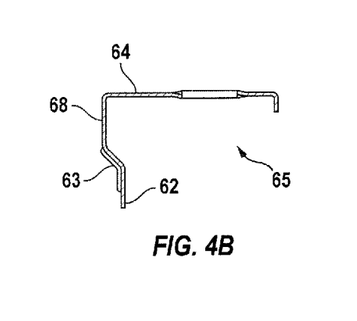

In turning to FIGS. 4A and 4B, ground clip 65 is depicted in additional detail. Specifically, FIG. 4A shows ground clip 65 configured from flat stock having star washer 66 for receipt of bolt 2A appending segment 65 to first mounting fixture 35 and a sidewall of first photovoltaic solar panel 11. Once bent into its FIG. 4B (final) configuration, segment 68 is bent 90 degrees from portion 64 traveling down the side of first mounting fixture 35, and taking a bend at pivot edge 63 tailing off in section 62. Through this configuration, it is noted particularly in reference to FIGS. 3A and 3B that as long as first mounting fixture 35 is in contact with first turned in edge 53 of strut rail 50, electrical contact is maintained between these two elements. This is critical in ensuring proper grounding between these parts for the safety of anyone working with the present invention. For example, if someone was to lift first photovoltaic solar panel 11 from its horizontal (FIG. 3B) orientation tilting it upwards to enable one to either remove the panel or gain access to the interior of lower strut rail 50 (FIG. 3A), grounding of first photovoltaic solar panel 11 would be maintained throughout. Ground clip 65 is maintained as shown by securing bolt 2 from the interior of first photovoltaic solar panel 11 through star washer 66 and terminating at tooth 37.

Figure 5A:
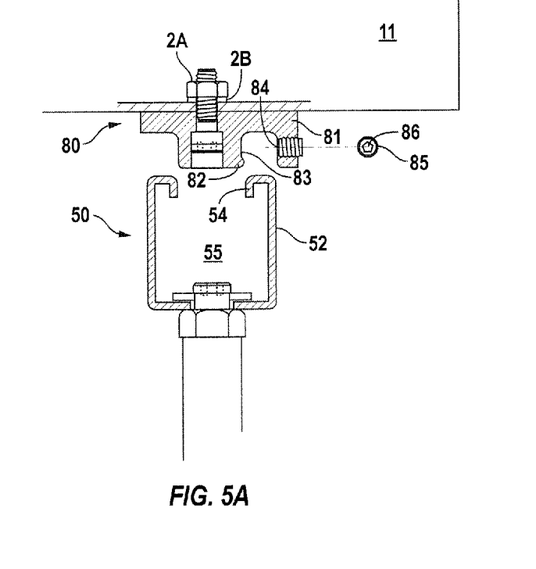
FIGS. 5A and 5B are partial cross sectional views of a typical second mounting fixture employed for securing photovoltaic solar panels to the strut rails of the present invention.
Figure 5B:
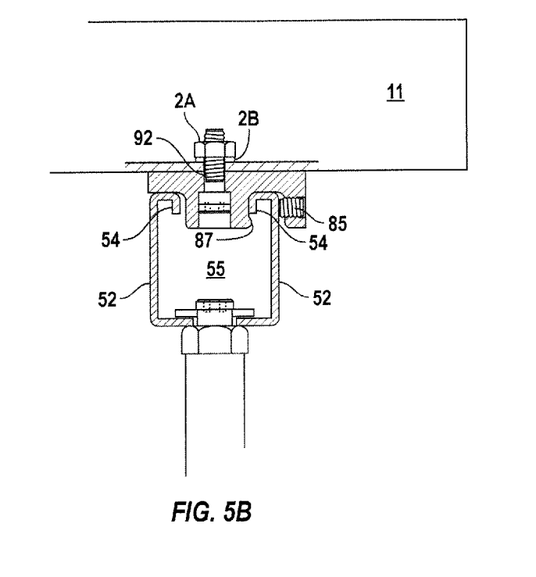

Both first mounting fixture 35, applied to first photovoltaic solar panel 11 and second mounting fixture 80 secured to all photovoltaic solar panels are secured via bolts 2/2A generally held in position with serrated flange nut 2B. Mounting fixture 80 includes mounting block 81 secured to photovoltaic solar panel 11 as illustrated in FIGS. 5A and 5B. Second mounting block 81 comprises protrusion 82 being sized to extend between sidewalls 52 and within open area 55 contained within strut rail 50. Protrusion 82 is provided with indent 83 which can, in turn, capture turned in edge 54 of strut rail 50. Once mounting block 81 has been placed atop strut rail 50 such that protrusion 82 is between turned in edges 54, indent 83 is urged against turned in edge 54 as shown in FIG. 5B.

To secure second mounting block 81 to strut rail 50, set screw 85 is installed within threaded hole 84 and tightened by virtue of keyed opening 86, generally configured to require a specialized tool for rotation. Such screw 85 is tightened within threaded hole 84 until it abuts sidewall 52 of strut rail 50 as noted in reference to FIG. 5B, turned in edge 54 nests within indent 83 causing locking ridge 87 to overlap turned in edge 54 and prevent the inadvertent removal of second mounting fixture 80 from strut rail 50. To execute removal, one would loosen said screw 85 from threaded hole 84.

As alluded to previously, first mounting block 30 acts as a hinge to provide easy access to wiring and, general access to the interior of strut rail 50. This ability to immediately achieve attachment to strut rail 50 prevents first photovoltaic solar panel 11 from sliding down the surface of a sloped roof thus generally increasing safety. The upper end of first photovoltaic solar panel 11 is supported by second mounting fixture 80 containing releasable locks securing first photovoltaic solar panel 11 to the appropriate rail member as shown in detail in FIGS. 5A and 5B.

In the embodiments disclosed in referenced U.S. Pat. Nos. 7,971,398 and 8,136,310, each substantially rectangular photovoltaic solar panel would support first mounting block 35 and second mounting block 80 proximate its first and second edges, respectively generally at each of their corners. As disclosed below, this would require hardware which would be redundant if the present invention was to be carried out. In this regard, reference is made to FIGS. 7A and 7B.

In practicing the present invention, it is suggested that first photovoltaic solar panel 11 be mounted with both first mounting fixture 35 proximate it's first edge and second mounting fixture 80 proximate its second edge. In referring to FIG. 1A, first edge 101 of first photovoltaic solar panel 11 is generally identified being at the bottom most portion of sloped roof 14. In turning to FIG. 7A, when second photovoltaic solar panel 11A is to be joined to first photovoltaic solar panel 11, a hook and groove engagement is provided** noting that hook 2 proximate first edge 103 of second photovoltaic solar panel 11A is received by groove 3 proximate second edge 102 of first photovoltaic solar panel 11. Through such an engagement, one need not employ first mounting fixture 35 proximate first edge 103 of second photovoltaic solar panel 11A while maintaining a robust panel to panel joiner along interface 14. It is also contemplated that spacing 4 be provided as clearance for anticipated expansion of adjacent photovoltaic solar panels, the seam between solar panels being sealed to prevent water intrusion by seal 95. This can be accomplished by providing press in rubber gaskets.

Turning to FIGS. 8A and 8B, a method of splicing rail segments is shown which accommodates expansion and contraction of rails without the usual standoff displacement caused by extremes in temperature. FIG. 8A is a sectional view of rail splice 120 showing end to end abutment of rails with strut rail members 50 rigidly spliced together not to exceed 80 ft. in length to retain full thermal floating of rails. FIGS. 8A and 8B further show rail splice 120 with shear plates 121 affixed with bolts 122 and star washers 123 to assure electrical conductivity. Note in FIG. 8B that rail splice 120 shows symmetrical design of shear plates 121 to include relief areas 124 to accommodate pivot mount tooth 37.

Figure 7C:
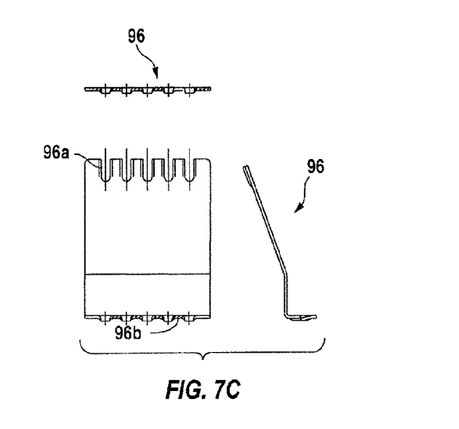
FIG. 7C is a front, top and edge view of ground clip at interface between panels.

In summary, a first row of photovoltaic solar panels 11 employ both first and second mounting fixtures 35 and 80 and, thereafter, only one rail is required for additional rows resulting in fewer rails and roof penetrations to secure photovoltaic solar panels to the roof than suggested by applicant's prior patents. This provides for immediate drop in photovoltaic panel attachment with precise alignment noting that succeeding photovoltaic solar panels pivot-lock to the top edge of prior panels with a gap, suggested to be approximately 0.07 inches allowing for thermal expansion and floating stand offs for horizontal movement. To finalize the interface, ground clip 96 can be configured as shown, ideally possessing knife edges at 96A and 96B to penetrate anticipated anodized coatings to ensure appropriate electrical conductivity between adjacent photovoltaic solar panels. Ground clip 96 is further illustrated in FIG. 7C showing front, top, and edge views.

Figure 6A:
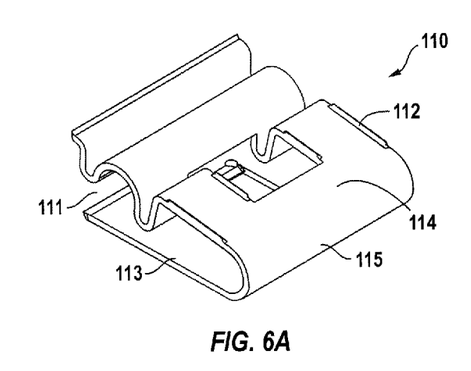
FIGS. 6A and 6B are perspective views of a lay-in ground clip used to establish a grounding wire connection to one or more strut rails of the present invention.
Figure 6B:
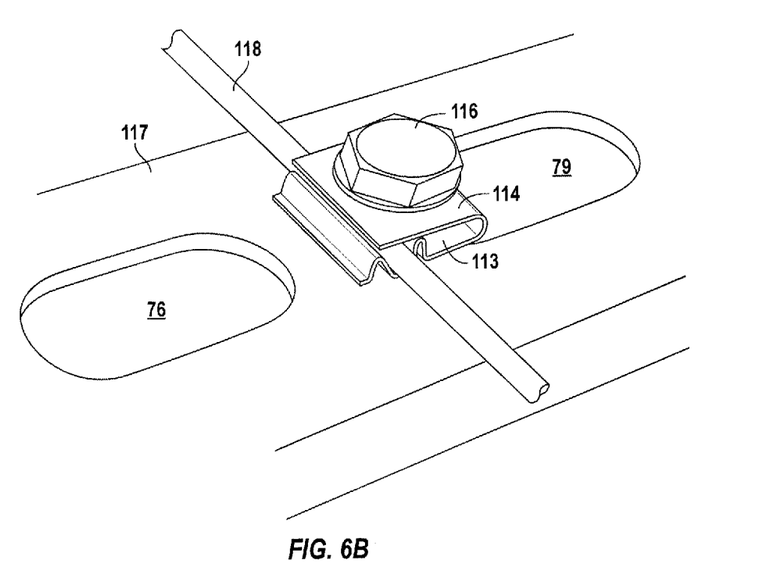

In turning to FIGS. 6A and 6B, a lay-in ground clip is shown which is ideally suited for creating a grounding path between the present system and a suitable electrical ground. Lay-in ground clip 110 has been configured to ideally attach to appropriate rails 50 through the use of mounting bolt 116. When in its relaxed state (FIG. 6A), U-shaped bracket 110 composed of legs 113 and 114 are relatively spaced apart such that channel 111 is distant from leg 114. However, once copper wire 118 has been placed within channel 111, bolt 116 can be tightened thus bringing legs 113 and 114 together and closing lay-in ground clip 110 thus preventing copper wire 118 from being inadvertently dislodged from clip 110. As noted, clip 110 can be partially open by loosening bolt 116 for easy wire insertion within channel 111. As shown in FIG. 6A, a piercing edge 112 of lay-in ground clip 110 can be employed together with bolt 116 for penetrating any possible anodized coating which may be employed on strut rails 50. Lay-in ground clip 110 can be employed on one or more strut rails to ensure appropriate electrical grounding of the present system.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A system for mounting a plurality of photovoltaic solar panels onto a roof, said system comprising first and second strut rails, each strut rail having a length and a cross section, each cross section having a base, sidewalls and first and second turned in edges, a first mounting fixture comprising a first mounting block for removably appending said photovoltaic solar panels to a first of said strut rails, said first mounting block having a tooth at its first edge and a cam at its second edge, said tooth sized and positioned to fit beneath the first turned in edge of said first strut rail while said cam frictionally abuts a second turned in edge of said first strut rail and a second mounting fixture comprising a second mounting block for removably appending said photovoltaic solar panel to said second strut rail, said second mounting block comprising a protruding shaft being sized to extend between said sidewalls of said second strut rail and further having an indent configured within said protruding shaft for capturing one of said first or second turned in edges when said indent is urged against one of said first or second turned in edges for releasably securing said photovoltaic solar panels to said second strut rail, a first of said plurality of photovoltaic solar panels having said first mounting fixture affixed proximate a first edge thereof and said second mounting fixture affixed proximate a second edge thereof, providing a second photovoltaic solar panel being substantially rectangular, said second edge of said first photovoltaic solar panel and a first edge of said second photovoltaic solar panel having complimentary hook and groove features to enable said first and second photovoltaic solar panels to releasably attach to one another, said second photovoltaic solar panel being devoid of said first mounting fixture and having said second mounting fixture affixed proximate its second edge.

2. The system of claim 1 wherein a seam is established between the second edge of said first photovoltaic solar panel and said first edge of said second photovoltaic solar panel, said seam being sealed to substantially prevent water intrusion therethrough.

3. The system of claim 1 wherein a gap is established between said hook and groove features to allow for thermal expansion and contraction of said adjacent first and second photovoltaic solar panels.

4. The system of claim 1 wherein a ground clip is located between said second edge of said first photovoltaic solar panel and said first edge of said second photovoltaic solar panel for establishing electrical conductivity between said adjacent photovoltaic solar panels.

5. The system of claim 1 wherein said first and second strut rails are each comprised of a plurality of rail members joined end to end and further comprising shear plates positioned at said end to end joinder thereof.

6. The system of claim 5 wherein said shear plates include relief areas sized to receive first and second mounting blocks therein.

7. A system for mounting a plurality of photovoltaic solar panels onto a roof, said system comprising first and second strut rails, each strut rail having a length and a cross section, each cross section having a base, sidewalls and first and second turned in edges, a first mounting fixture comprising a first mounting block for removably appending said photovoltaic solar panels to a first of said strut rails, said first mounting block having a tooth at its first edge and a cam at its second edge, said tooth sized and positioned to fit beneath a first turned in edge of said first strut rail while said cam frictionally abuts a second turned in edge of said first strut rail, a ground clip affixed to said first mounting block extending to said tooth and providing a grounding path for as long as said first mounting block is in contact with said first strut rail and a second mounting fixture comprising a second mounting block for removably appending said photovoltaic solar panel to said second strut rail, said second mounting block comprising a protruding shaft being sized to extend between said sidewalls of said second strut rail and further having an indent configured within said protruding shaft for capturing one of said first or second turned in edges when said indent is urged against one of said first or second turned in edges for releasably securing said photovoltaic solar panels to said second strut rail and ground clips located between said plurality of photovoltaic solar panels for establishing electrical conductivity between them.

8. The system of claim 7 wherein said ground clip comprising parallel knife edges in that segment of said ground clip intended to contact said first strut rail when said first mounting block and first strut rail are in contact with one another.

9. A system for mounting photovoltaic solar panels onto a roof, said system comprising first and second strut rails, each strut rail having a length and a cross section, each cross section having a base, sidewalls and first and second turned in edges, a first mounting fixture comprising a first mounting block for removably appending said photovoltaic solar panels to a first of said strut rails, said first mounting block having a tooth at its first edge and a cam at its second edge, said tooth sized and positioned to fit beneath a first turned in edge of said first strut rail while said cam frictionally abuts a second turned in edge of said first strut rail and a second mounting fixture comprising a second mounting block for removably appending said photovoltaic solar panel to said second strut rail, said second mounting block comprising a protruding shaft being sized to extend between said sidewalls of said second strut rail and further having an indent configured within said protruding shaft for capturing one of said first or second turned in edges when said indent is urged against one of said first or second turned in edges for releasably securing said photovoltaic solar panels to said second strut rail and further comprising a grounding path from said system, said grounding path established by a conductive wire and lay-in ground clip, said lay-in ground clip being substantially U-shaped with a channel sized to receive said wire and openings therein for securing said lay-in ground clip to at least one of said strut rails.

10. The system of claim 9 wherein said channel is configured such that as said lay-in ground clip is secured to at least one of said strut rails, said U-shaped lay-in ground clip acts to clamp down upon said wire substantially preventing its movement within said channel.

11. The system of claim 10 wherein said wire is removable from said channel without requiring removal of said lay-in ground clip from at least one of said strut rails.

\* \* \* \* \*